United States Patent
Bonilla et al.

(10) Patent No.: US 11,462,924 B2
(45) Date of Patent: Oct. 4, 2022

(54) DEVICE CHARGING SYSTEM

(71) Applicant: Hubbell Incorporated, Shelton, CT (US)

(72) Inventors: Nelson Bonilla, Winter Garden, FL (US); Jason Walker, Bethany, CT (US); John Brower, Fairfield, CT (US); Matthew Samojeden, Rye, NY (US); Michael Esposito, Ansonia, CT (US); Jian Li, Bayside, NY (US); Thomas Scanzillo, Monroe, CT (US); David Lutz, Woodbridge, CT (US); Kenny Padro, Hamden, CT (US); Ryan Papageorge, Shelton, CT (US); Scott Wurms, Shelton, CT (US); Eric Larsen, Westport, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/879,271

(22) Filed: May 20, 2020

(65) Prior Publication Data

US 2020/0373771 A1  Nov. 26, 2020

Related U.S. Application Data

(60) Provisional application No. 62/850,284, filed on May 20, 2019.

(51) Int. Cl.
*H02J 7/00* (2006.01)
*H02J 7/02* (2016.01)

(52) U.S. Cl.
CPC .............. *H02J 7/0045* (2013.01); *H02J 7/02* (2013.01)

(58) Field of Classification Search
CPC ...................................................... G06Q 20/18
USPC ............................................................ 320/115
See application file for complete search history.

(56) References Cited

U.S. PATENT DOCUMENTS

| 8,718,717 | B2 * | 5/2014 | Vaknin | H02J 7/0027 |
| | | | | 455/573 |
| 9,077,055 | B2 | 7/2015 | Yau | |
| 9,300,151 | B2 | 3/2016 | Chen et al. | |
| 9,870,670 | B2 | 1/2018 | Yau | |
| 9,985,451 | B2 | 5/2018 | Yau | |
| 10,040,359 | B2 * | 8/2018 | Chen | H02J 7/0044 |
| 10,084,329 | B2 * | 9/2018 | Hamilton | H02J 7/0045 |
| 10,460,547 | B2 | 10/2019 | Yau | |
| 10,529,973 | B2 | 1/2020 | Yau | |
| 2009/0284216 | A1 | 11/2009 | Bessa et al. | |

(Continued)

FOREIGN PATENT DOCUMENTS

| KR | 101745610 B1 * | 6/2017 | ............. G06Q 20/38 |

OTHER PUBLICATIONS

PCT/US2020/033786 International Search Report and Written dated Sep. 30, 2020.

*Primary Examiner* — Edward Tso
*Assistant Examiner* — Ahmed H Omar
(74) *Attorney, Agent, or Firm* — Michael Best & Friedrich LLP

(57) ABSTRACT

A portable device charging unit includes a battery, a base supporting the battery and including an inductive charging surface, and at least one retainer for selectively securing an electronic device in engagement against the inductive charging surface. In addition, a system may be provided for storing and dispensing one or more device charging units.

9 Claims, 8 Drawing Sheets

(56) References Cited

U.S. PATENT DOCUMENTS

| | | | |
|---|---|---|---|
| 2012/0024917 A1* | 2/2012 | Case | A45F 5/021 |
| | | | 224/259 |
| 2012/0037783 A1 | 2/2012 | Alexander et al. | |
| 2013/0271070 A1 | 10/2013 | Hirano | |
| 2014/0310165 A1 | 10/2014 | Yau | |
| 2015/0070580 A1 | 3/2015 | Graether | |
| 2015/0097441 A1 | 4/2015 | Jung et al. | |
| 2015/0140379 A1 | 5/2015 | Yau | |
| 2016/0294427 A1 | 10/2016 | Wojcik | |
| 2016/0365744 A1 | 12/2016 | Hyun | |
| 2017/0110902 A1* | 4/2017 | Miller | H02J 7/0044 |
| 2017/0324121 A1 | 11/2017 | Yau | |
| 2018/0012438 A1* | 1/2018 | Sinofsky | H02J 7/0044 |
| 2018/0279809 A1 | 10/2018 | Regan et al. | |
| 2019/0006862 A1 | 1/2019 | Hamilton et al. | |
| 2020/0044207 A1* | 2/2020 | Murphey | H01M 10/0525 |
| 2020/0144586 A1 | 5/2020 | Yau | |
| 2020/0066081 A1 | 8/2020 | Yau | |

* cited by examiner

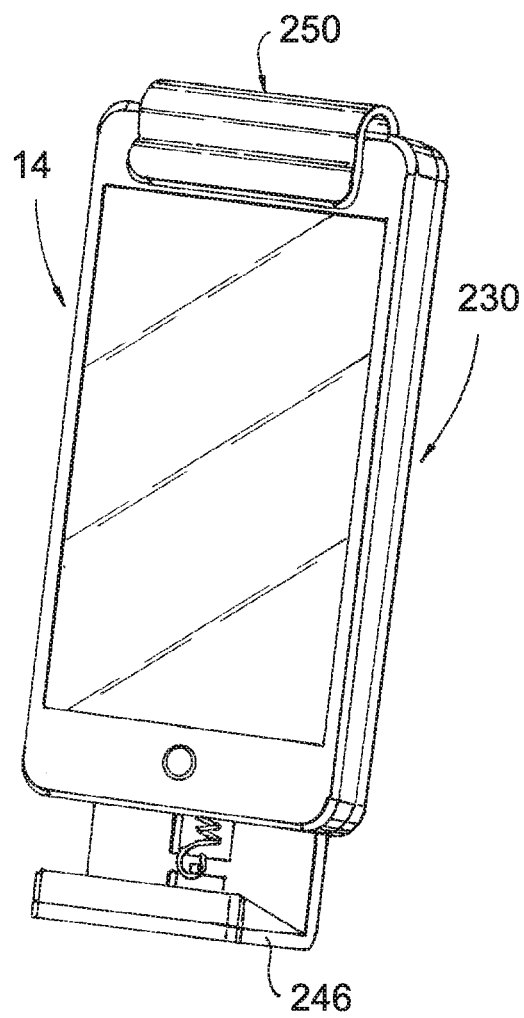
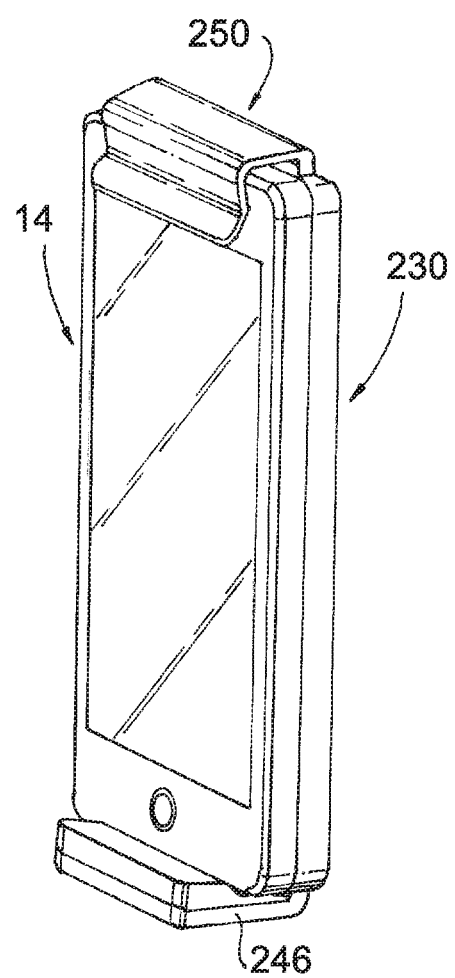

DEVICE CHARGING SYSTEM

REFERENCE TO RELATED APPLICATION

This application claims the benefit of U.S. Provisional Patent Application No. 62/850,284, filed May 20, 2019, the entire contents of which are incorporated by reference.

FIELD

The present disclosure relates to a device charging system, including a portable device charging unit and a storage station.

SUMMARY

In one independent aspect, a portable device charging unit includes a battery, a base supporting the battery and including an inductive charging surface, and at least one retainer for selectively securing an electronic device in engagement against the inductive charging surface.

In some aspects, the retainer includes an arm that is movable between an extended position and a retracted position, the arm being configured to retain the electronic device while in the extended position.

In some aspects, the arm includes a first portion and a second portion, the first portion being extendable and retractable relative to the base, the second portion being extendable and retractable relative to the first portion.

In some aspects, the arm is slidable relative to the base.

In some aspects, the retainer includes an arm positioned adjacent an edge of the base portion, the arm biased to engage the electronic device and retain the electronic device relative to the inductive charging surface.

In some aspects, the retainer includes a resilient member that is capable of accommodating electronic devices of various sizes and shapes.

In some aspects, the retainer includes a receptacle formed from a resilient material, the receptacle configured to receive a portion of the electronic device.

In some aspects, the retainer includes a band formed from a resilient material, the band extending across a corner of the charging surface.

In some aspects, the retainer includes an arm positioned adjacent an edge of the base portion and configured to engage an edge of the electronic device, the arm biased toward a retracted position.

In some aspects, the retainer includes a clamp arm.

In some aspects, the retainer includes a reusable adhesive surface positioned adjacent the inductive charging surface.

In another independent aspect, a system is provided for storing and dispensing charging units for portable electronic devices. The system includes: at least one portable charging unit and a terminal. The charging unit includes a body and a battery supported on the body, and the charging unit is configured to engage an electronic device and provide electrical current to the electronic device. The terminal includes a receptacle for storing the at least one portable charging unit, and the terminal is configured to provide electrical current to the battery.

In some aspects, the terminal is configured to inhibit removal of the charging unit until a predetermined condition has been satisfied.

In some aspects, the predetermined condition includes completion of a financial transaction.

In some aspects, the receptacle includes multiple slots, each slot configured to receive one of the charging units.

In some aspects, the charging unit body includes an inductive charging surface, and at least one retainer for selectively securing the electronic device in engagement against the inductive charging surface.

In some aspects, the retainer includes an arm that is movable between an extended position and a retracted position, the arm configured to engage and retain the electronic device.

In some aspects, the retainer includes a receptacle formed from a resilient material, the receptacle configured to receive a portion of the electronic device.

In some aspects, the retainer includes a band formed from a resilient material, the band extending across a corner of the charging surface.

In some aspects, the retainer includes a reusable adhesive surface positioned adjacent the inductive charging surface.

Other aspects will become apparent by consideration of the detailed description and accompanying drawings.

BRIEF DESCRIPTION OF THE DRAWINGS

FIG. 9 is a perspective of the device charger according to another embodiment, with a retention arm in an extended position.

FIG. 10 is a perspective view of the device charger of FIG. 9, with the retention arm in a retracted position.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
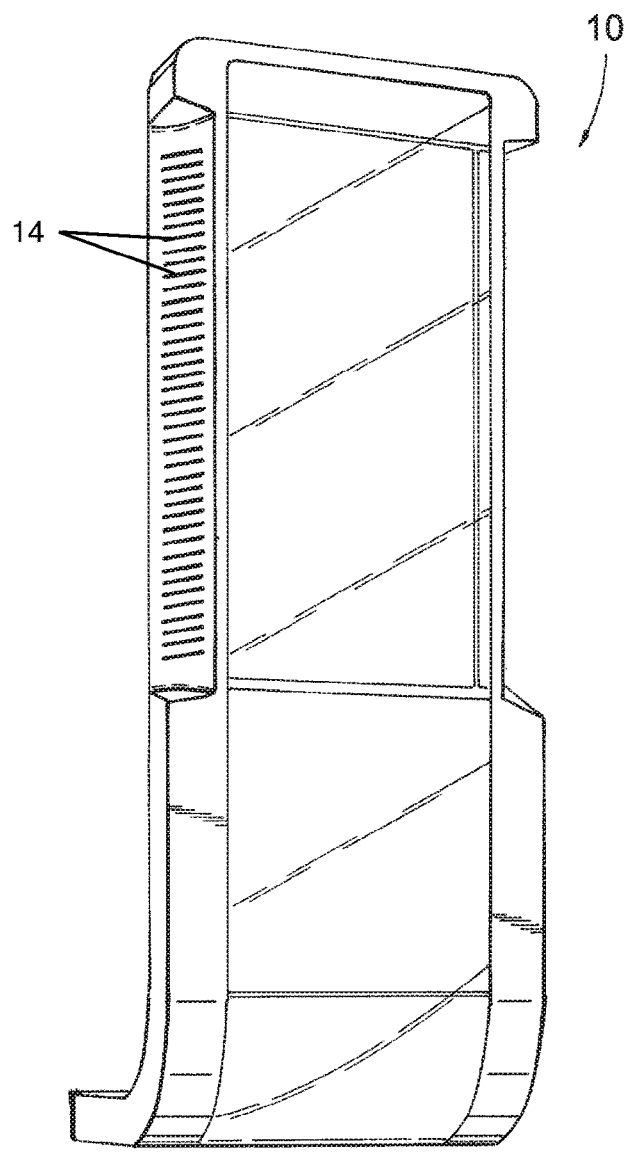
FIG. 1 is a perspective view of a docking station.
Figure 2:
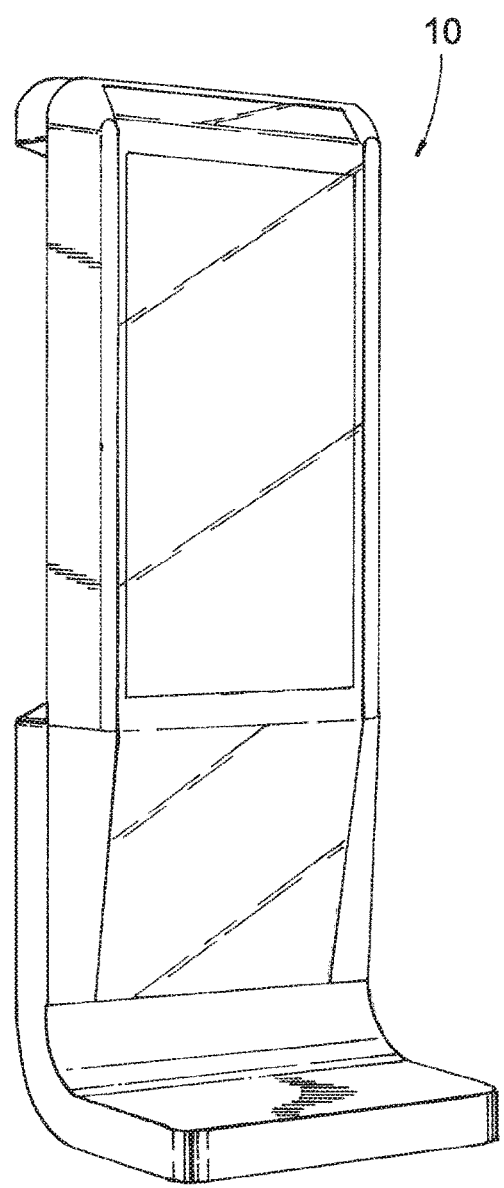
FIG. 2 is another perspective view of the docking station of FIG. 1.
Figure 3:
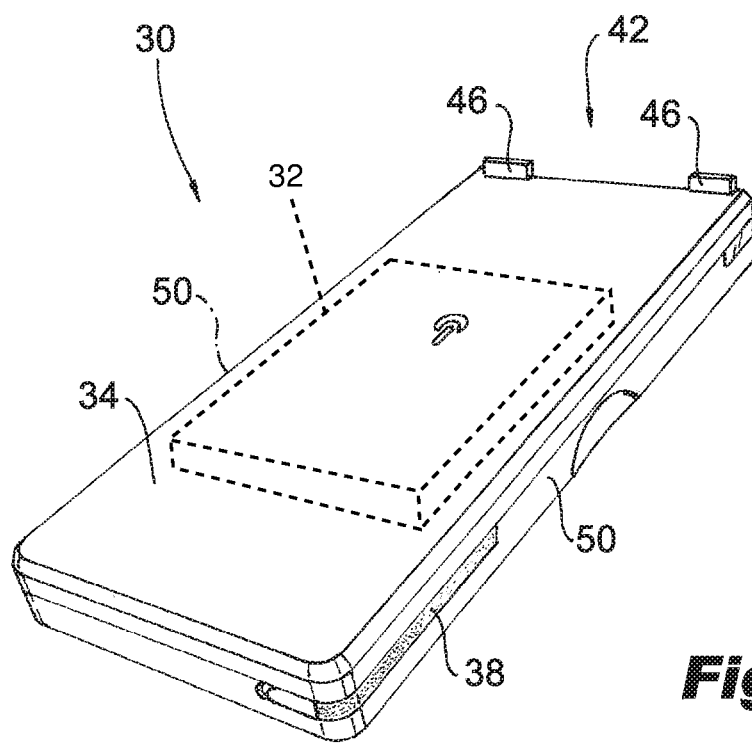
FIG. 3 is a perspective view of a device charger with retention arms in retracted positions.
Figure 4:
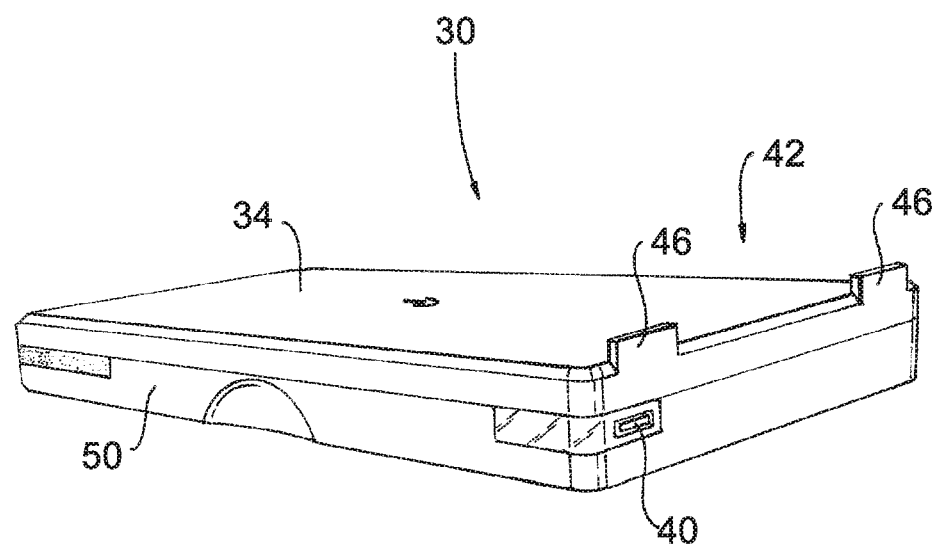
FIG. 4 is another perspective view of the device charger of FIG. 3.

FIGS. 1 and 2 illustrate a docking station 10 for storing and dispensing charging units. In the illustrated embodiment, the docking station 10 stores multiple inductive charging units that can be dispensed to one or more users. In some embodiments, the charging units can be rented for a period of time, can be provided free of charge, or can be purchased (e.g., in the event the charging unit is not returned to the docking station). In some embodiments, the docking station 10 includes hardware and software providing communication with mobile devices (e.g., smartphones). For example, a customer may purchase or "check out" a charging unit, and in response the docking station 10 may unlock a charging unit and make it available to the customer. In some embodiments, the station 10 includes multiple slots or receptacles 14, and a charging unit may be stored in each of the receptacles 14. In some embodiments, the charging unit may be charged by the station 10 while stored on the station 10. The station 10 may authorize a charging unit to be removed from its associated receptacle 14 after a pre-determined event (e.g., payment of a fee).

FIGS. 3-6 illustrate an example of a device charging unit 30. In the illustrated embodiment, the charging unit 30 includes a battery pack 32 (FIG. 3) supported (e.g., enclosed) in a housing, and an inductive charging surface 34. The charging unit 30 further includes retainers 42 (FIGS. 5 and 6) for securing an electronic device (e.g., a mobile phone 14—FIG. 8) against the inductive charging surface 34. In the illustrated embodiment, the charging unit 30 also includes an indicator 38 (e.g., a light) to notify a user of the remaining charge on the charging unit's battery pack 32. In addition, in the illustrated embodiment the charging unit 30 includes one or more charging ports 40 (e.g., a USB-C port). The charging port 40 can be coupled to a power source to re-charge the charging unit battery pack and/or provide an auxiliary connection for a user to charge an electronic device. In other embodiments, the charging unit 30 may include one or more cords and connectors either in addition to or instead of the charging port 40.

Figure 5:
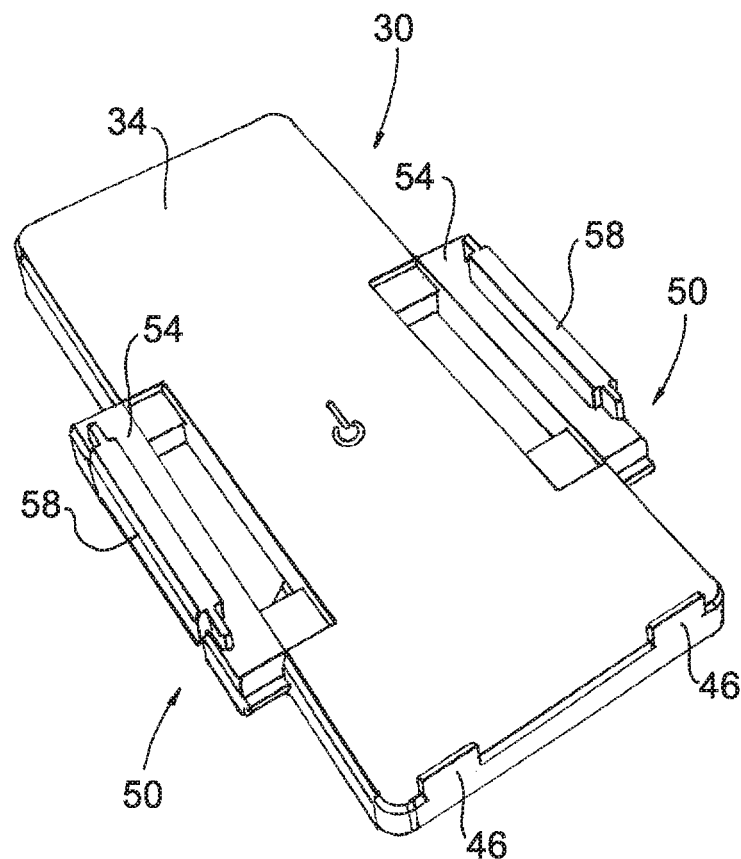
FIG. 5 is a perspective of the device charger of FIG. 3 with retention arms in extended positions.
Figure 6:
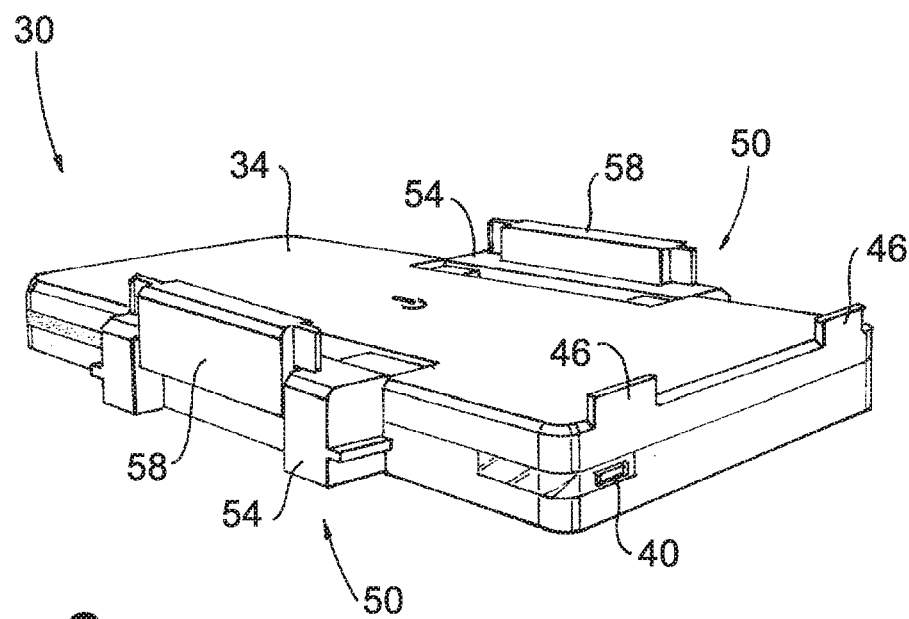
FIG. 6 is another perspective view of the device charger of FIG. 5.

As shown in FIGS. 5 and 6, the retainers 42 include one or more projections 46 positioned adjacent a lower end of the charging unit 30, and a pair of arms 50. Each arm 50 is positioned adjacent a side of the charging unit. In the illustrated embodiment, each arm 50 includes a first portion 54 and a second portion 58. The first portion 54 is extendable and retractable in a lateral direction (e.g., parallel to a plane of the charging surface 34), while the second portion 58 is coupled to the first portion 54 and is extendable and retractable in a normal direction (e.g., perpendicular to a plane of the charging surface 34). The arm portions 54, 58 can be extended so that the arms 50 engage and retain the electronic device 14, and can be retracted to provide a slimmer profile for storage. The arms 50 may be biased by, for example, a spring (not shown) or another suitable mechanism.

Figure 7:
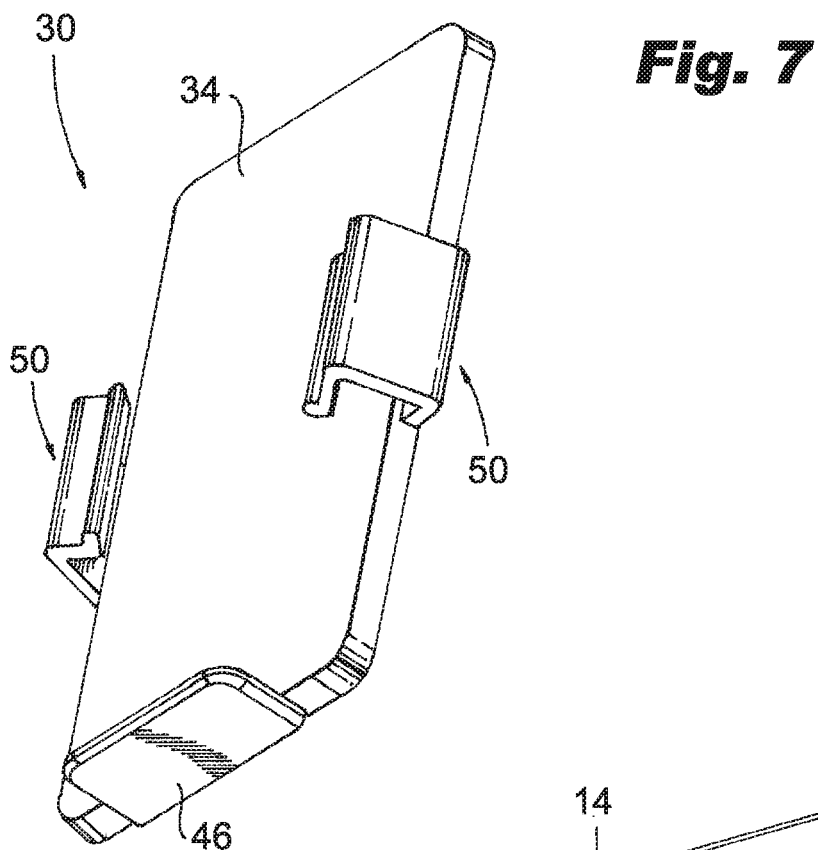
FIG. 7 is a perspective view of a device charger according to another embodiment.
Figure 8:
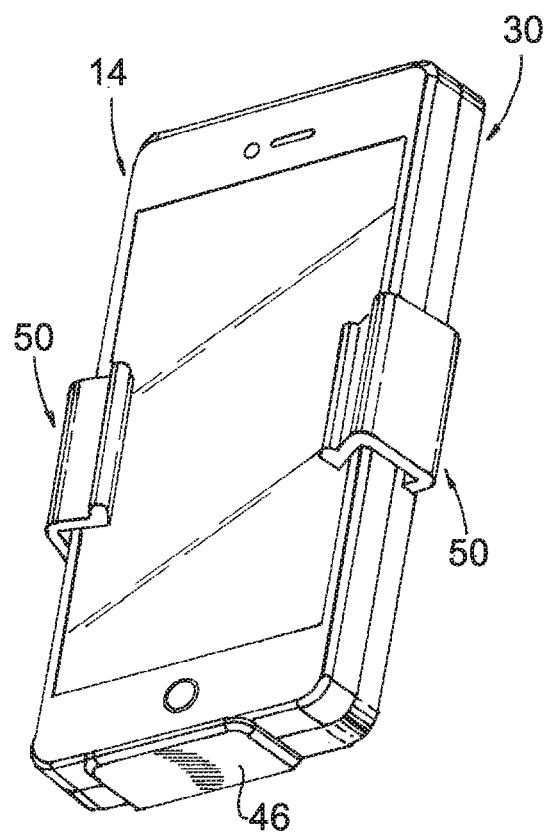
FIG. 8 is a perspective view of an electronic device coupled to the device charger of FIG. 7.

In other embodiments, as shown for example in FIGS. 7 and 8, the charging unit 30 can include clamp arms 50 and a single elongated projection 46 to engage the electronic device 14. The clamp arms 50 are substantially fixed but may be moved elastically to position the electronic device 14 between the clamp arms 50 and the charging surface 34. In some embodiments, the electronic device 14 may be positioned in the charging unit 30 by sliding the electronic device from one end of the charging unit toward the end having the projection 46.

FIGS. 9 and 10 illustrate a charging unit 230 according to another embodiment. Rather than arms positioned adjacent the sides, the charging unit 230 includes retainers positioned adjacent the ends of the unit 230. In the illustrated embodiment, a clamp or arm 250 is positioned adjacent one end of the unit 230, and an extendable/retractable projection 246 is positioned adjacent an opposite end of the unit 230. The projection 246 includes a wedge surface to engage an end of the electronic device 14, and the projection 246 is biased (e.g., by a spring) toward a retracted position to bias the electronic device into engagement with the fixed arm 250.

Figure 11:
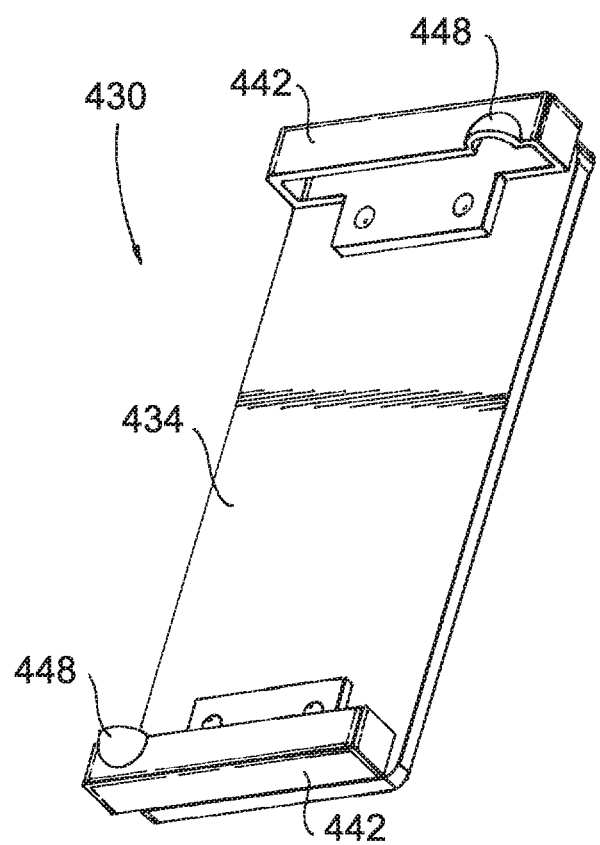
FIG. 11 is a perspective view of a device charger according to another embodiment.
Figure 12:
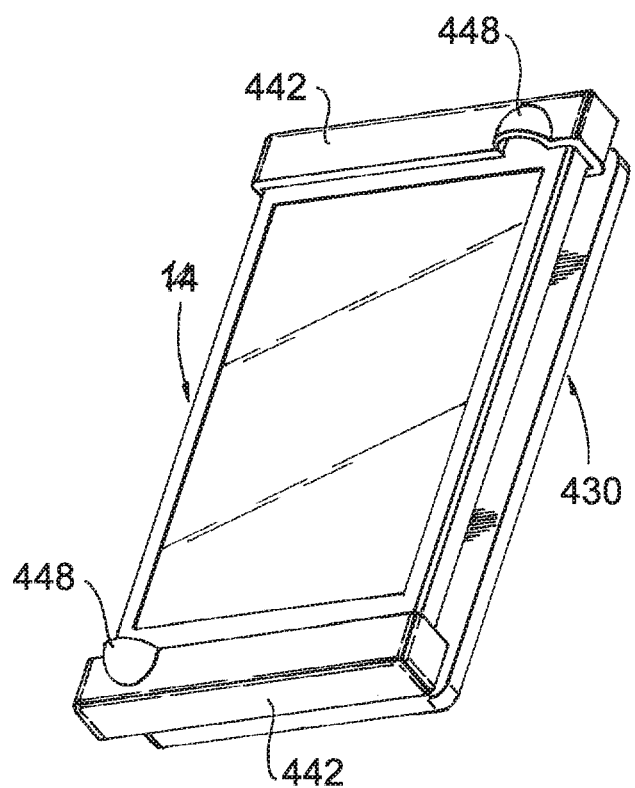
FIG. 12 is a perspective view of an electronic device coupled to the device charger of FIG. 11.

FIGS. 11 and 12 illustrate a charging unit 430 according to another embodiment. The charging unit 430 includes a pair of retainers 442, each of which is positioned adjacent an opposite end of the unit 430 from the other. Each retainer 442 is formed as a resilient band or receptacle and is capable of stretching to accommodate devices of various sizes. In the illustrated embodiment, each retainer 442 is formed as a member having a closed end. Each retainer 442 may include a lip or tab 448 that can be gripped by a user to facilitate inserting a portion of the electronic device 14 into the retainer 442 or removing the electronic device from the retainer 442.

Figure 13:
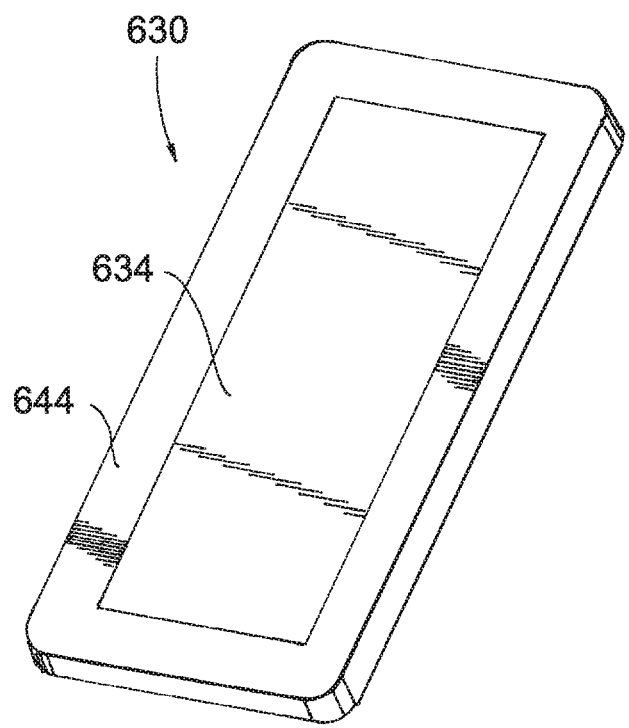
FIG. 13 is a perspective view of a device charger according to another embodiment.
Figure 14:
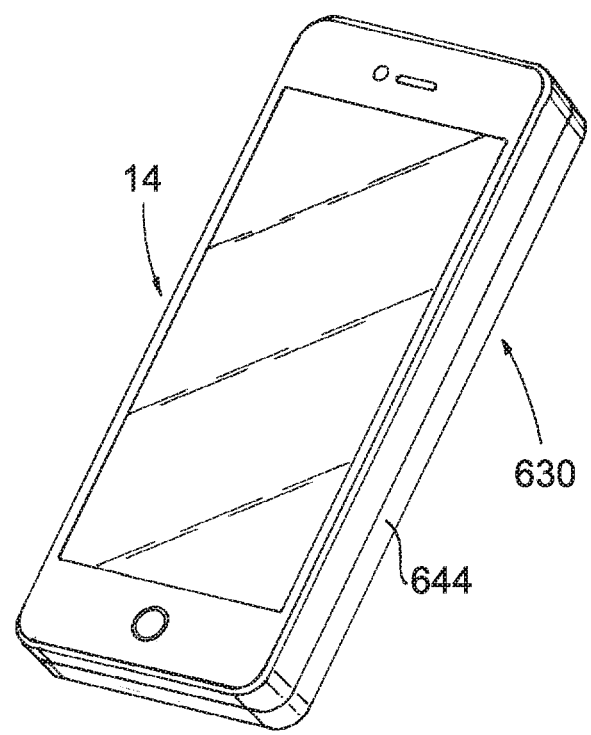
FIG. 14 is a perspective view of an electronic device coupled to the device charger of FIG. 13.

FIGS. 13 and 14 illustrate a charging unit 630 according to another embodiment. The charging unit 630 includes a retaining surface 644 positioned adjacent an inductive charging surface 634. In the illustrated embodiment, the retaining surface 644 extends around an outer peripheral portion of the charging surface 634. The retaining surface 644 includes a reusable adhesive that is capable of sticking to a surface of an electronic device 14. Electronic devices can be adhered to and removed from retaining surface 644 many times.

Figure 15:
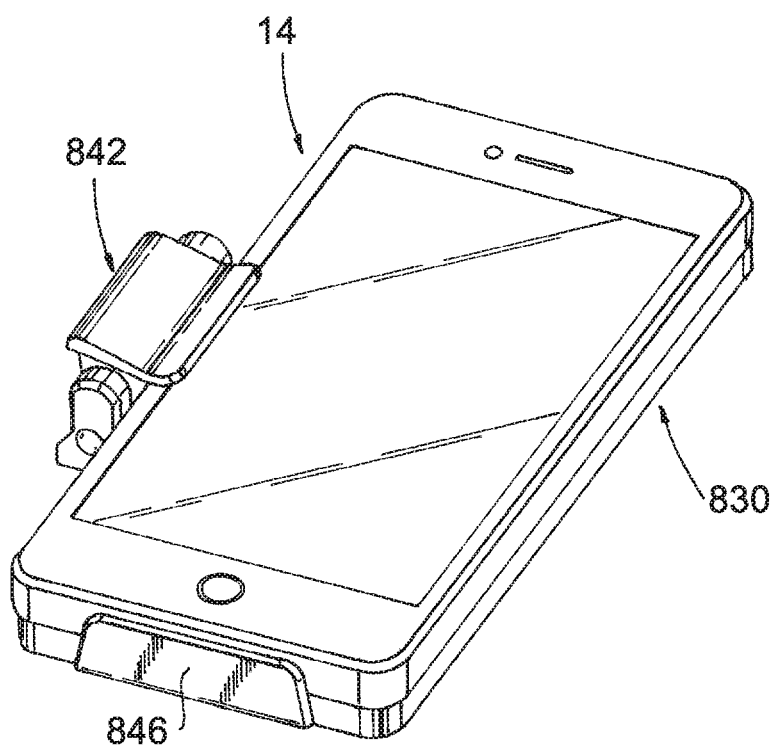
FIG. 15 is a perspective view of an electronic device coupled to a device charger according to another embodiment.

FIG. 15 illustrates a charging unit 830 according to another embodiment. The charging unit 830 includes a clamp retainer 842 positioned adjacent one side of the unit 830. In the illustrated embodiment, the clamp retainer 842 is biased toward an inductive charging surface to retain an electronic device, but the clamp retainer 842 can be actuated or pivoted to an open position in order to permit an electronic device to be positioned between the clamp retainer 842 and the charging surface. In addition, the charging unit 830 can include a projection 846 positioned adjacent one or more ends of the unit 830.

Figure 16:
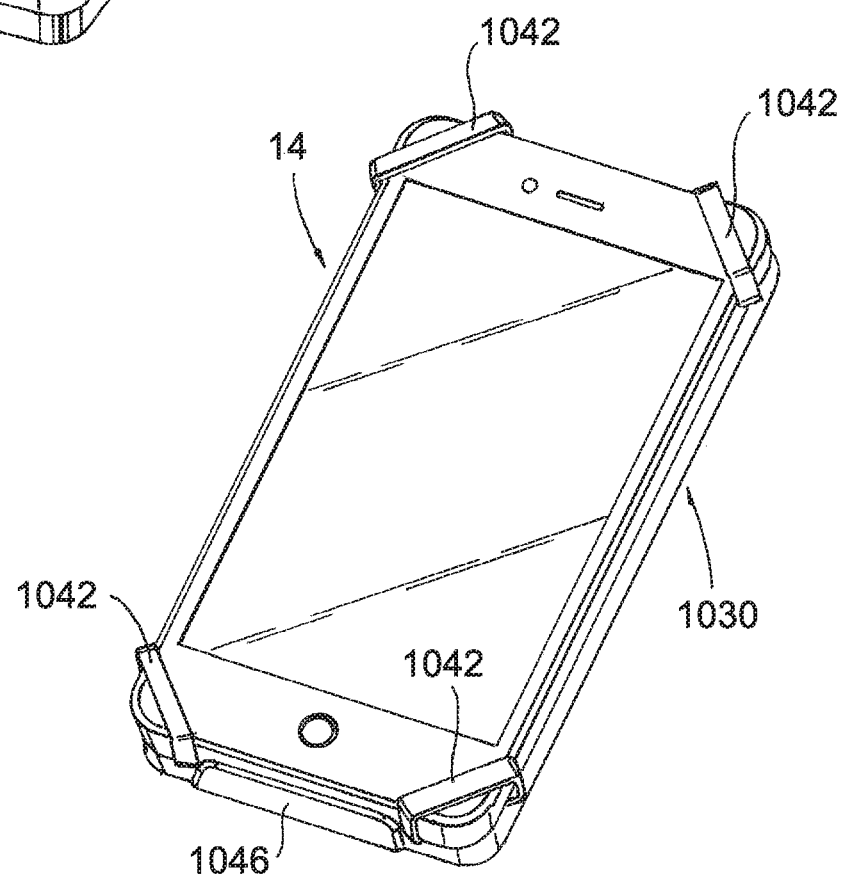
FIG. 16 is a perspective view of an electronic device coupled to a device charger according to another embodiment.

FIG. 16 illustrates a charging unit 1030 according to another embodiment. The charging unit 1030 includes a retainers 1042, each of which is positioned adjacent a respective corner of the unit 1030. Each retainer 1042 is formed as a resilient band oriented to extend across a corner, and the retainers 1042 are capable of stretching to accommodate devices of various sizes.

Among other things, the provision of portable charging units permits a user to charge an electronic device while moving and while charging the device. A user may purchase or borrow a charging unit having a charged battery from a docking station 10 and may use the electronic device 14 during charging. Once charging is complete and/or the user is finished using the charging unit, the charging unit may be returned to the docking station for re-charging for use by the same or another user.

The embodiments described above and illustrated in the figures are presented by way of example only and are not intended as a limitation upon the concepts and principles presented herein. As such, it will be appreciated that variations and modifications exist within the scope and spirit of one or more independent aspects as described.

What is claimed is:

1. A system for storing and dispensing charging units for portable electronic devices, the system comprising:
   a plurality of portable charging units, each charging unit including a body and a battery supported on the body, the charging unit configured to engage an electronic device and provide electrical current to the electronic device, each of the portable charging units further including a pair of arms, each of the arms including a first portion and a second portion supported on the first portion, one of the first portion and the second portion is extendable and retractable in a direction parallel to a plane of the body, and the other of the first portion and the second portion is extendable and retractable in a direction perpendicular to the plane of the body; and
   a terminal including a receptacle for storing the plurality of portable charging units, the receptacle including a plurality of slots, each slot configured to receive one of the charging units, the terminal configured to provide electrical current to the battery.

2. The system of claim 1, wherein the terminal is configured to inhibit removal of the charging unit from the associated slot until a predetermined condition has been satisfied.

3. The system of claim 2, wherein the predetermined condition includes completion of a financial transaction.

4. The system of claim 1, wherein the charging unit body includes an inductive charging surface, and the pair of arms secures the electronic device in engagement against the inductive charging surface.

5. The system of claim 1, wherein the charging unit includes a receptacle formed from a resilient material, the receptacle configured to receive a portion of the electronic device.

6. The system of claim 1, wherein the charging unit includes a band formed from a resilient material, the band extending across a corner of the charging surface.

7. The system of claim 4, wherein the charging unit includes a reusable adhesive surface positioned adjacent the inductive charging surface.

8. The system of claim 1, wherein the arms are positioned on opposite sides of the body and face toward one another, the arms biased toward one another.

9. The system of claim 1, wherein the first portion and the second portion are configured to engage the electronic device while the first portion and the second portion are in an extended position, and wherein the first portion and the second portion conform to a profile of the body while the first portion and the second portion are in a retracted position.

\* \* \* \* \*